US008407999B2

(12) United States Patent  
Gray, Jr.

(10) Patent No.: US 8,407,999 B2
(45) Date of Patent: Apr. 2, 2013

(54) EFFICIENCY TURBOCHARGED ENGINE SYSTEM WITH BOTTOMING CYCLE, AND METHOD OF OPERATION

(75) Inventor: Charles L. Gray, Jr., Pinckney, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 955 days.

(21) Appl. No.: 12/286,645

(22) Filed: Sep. 30, 2008

(65) Prior Publication Data

US 2010/0077746 A1 Apr. 1, 2010

(51) Int. Cl.
F01K 23/10 (2006.01)
F02B 33/44 (2006.01)
F02B 43/00 (2006.01)
F02B 47/00 (2006.01)
F02B 43/08 (2006.01)

(52) U.S. Cl. .................. 60/618; 60/598; 123/1 A; 123/3
(58) Field of Classification Search .................... 60/618, 60/670, 280, 320, 598; 123/1 A, 3
See application file for complete search history.

(56) References Cited

U.S. PATENT DOCUMENTS

| 2,360,969 | A |   | 10/1944 | Newcombe ..................... 60/618 |
| 2,979,887 | A | * | 4/1961  | Homola et al. .................. 60/598 |
| 4,003,204 | A | * | 1/1977  | Bradley ........................... 60/618 |
| 4,003,344 | A | * | 1/1977  | Bradley ........................... 60/618 |
| 4,003,345 | A | * | 1/1977  | Bradley ........................... 60/618 |
| 4,244,188 | A | * | 1/1981  | Joy ................................... 60/618 |
| 4,316,880 | A |   | 2/1982  | Jockel et al. ............... 423/415 A |
| 4,376,423 | A | * | 3/1983  | Knapstein ...................... 123/1 A |
| 4,429,534 | A | * | 2/1984  | Joy ................................... 60/618 |
| 4,632,774 | A |   | 12/1986 | Fox et al. ....................... 252/373 |
| 4,780,300 | A |   | 10/1988 | Yokoyama et al. ........ 423/415 A |
| 4,930,315 | A |   | 6/1990  | Kanesaka ........................ 60/600 |
| 5,417,068 | A | * | 5/1995  | Olofsson ......................... 60/602 |
| 5,704,210 | A | * | 1/1998  | Wang .............................. 60/598 |
| 6,186,126 | B1 |  | 2/2001  | Gray, Jr. ......................... 123/557 |

(Continued)

FOREIGN PATENT DOCUMENTS

DE 2639187 A1 3/1978
DE 2838490 B1 9/1978

(Continued)

OTHER PUBLICATIONS

A Certified English translation of the reference to Zarkon DE 28 38 490 B1, published on Feb. 21, 1980.*

(Continued)

*Primary Examiner* — Thai Ba Trieu
(74) *Attorney, Agent, or Firm* — David H. Read (57) ABSTRACT

A turbocharged engine system is configured to vaporize methanol using heat from exhaust gases and uses the vaporized methanol to drive the engine's turbocharger. The methanol may also be dissociated into hydrogen and carbon monoxide. After passing through the turbocharger, the vapor is injected into the engine by port injection. By selective timing of exhaust valves, the exhaust gases are separated into two streams, a first stream comprising gases ejected during exhaust blowdown, and a second stream of gases ejected during the remainder of the engine's exhaust stroke. The blowdown gases are employed to drive a separate turbine of the turbocharger.

31 Claims, 6 Drawing Sheets

U.S. PATENT DOCUMENTS

| | | | |
|---|---|---|---|
| 6,296,959 B2 * | 10/2001 | Takabe et al. | 429/412 |
| 6,438,956 B1 * | 8/2002 | Olofsson | 60/280 |
| 6,711,893 B2 * | 3/2004 | Ueda et al. | 123/3 |
| 6,751,956 B2 | 6/2004 | Mayer et al. | 60/602 |
| 6,883,325 B2 | 4/2005 | Chomiak | 60/618 |
| 7,041,272 B2 * | 5/2006 | Keefer et al. | 429/412 |
| 2003/0167768 A1 | 9/2003 | Clawson | 60/670 |
| 2004/0016234 A1 | 1/2004 | Chomiak | 60/618 |
| 2006/0042246 A1 | 3/2006 | Gray, Jr. et al. | 60/612 |
| 2007/0130948 A1 | 6/2007 | Boehm et al. | 60/612 |
| 2007/0277510 A1 | 12/2007 | McClure et al. | |
| 2009/0241540 A1 * | 10/2009 | Robel | 60/602 |
| 2010/0212304 A1 * | 8/2010 | Hoetger | 60/320 |
| 2011/0239643 A1 * | 10/2011 | LeJeune | 60/598 |

FOREIGN PATENT DOCUMENTS

| | | |
|---|---|---|
| DE | 102005025615 A1 | 12/2006 |
| EP | 1408224 A1 | 4/2004 |
| JP | 2003286905 A * | 10/2003 |
| WO | 2007014942 A2 | 2/2007 |

OTHER PUBLICATIONS

A Machine Transaltion copy of Antoine Hubert EP 1408224 A1, published on Apr. 14, 2004.*
BMW Developing Steam Assist Drive Based on Waste Heat Recovery, URL=http://www.greencarcongress.com/2005/12/bmw_developing_.html, download date Sep. 29, 2008.

* cited by examiner

EFFICIENCY TURBOCHARGED ENGINE SYSTEM WITH BOTTOMING CYCLE, AND METHOD OF OPERATION

BACKGROUND OF THE INVENTION

1. Technical Field

The disclosed principles of the invention are related generally to an internal combustion engine with turbocharger, and in particular to the use of waste heat or blowdown gases produced by the engine to drive the turbocharger, and also to the use of fuel as a working fluid to drive the turbocharger or other power producing means prior to introduction into the engine.

2. Description of the Related Art

Figure 1:
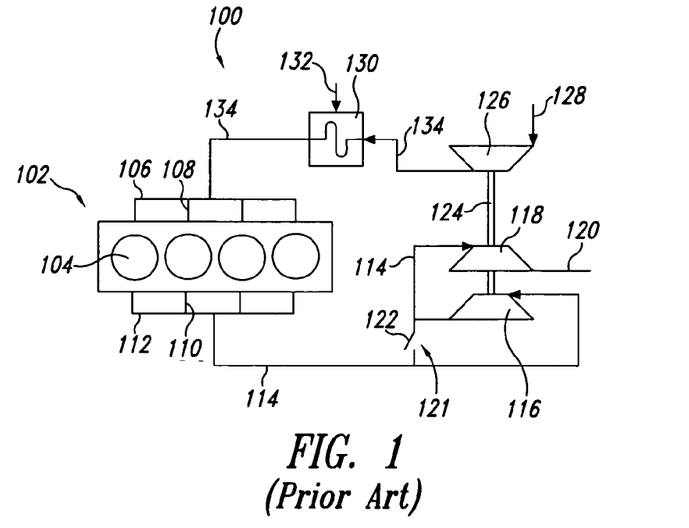
FIG. 1 is a simplified diagram of a turbocharged engine system according to known art.

Increasingly, automobiles are being manufactured with boost systems such as turbo charging or supercharging systems to improve engine efficiency. The various kinds of boost systems involve trade-offs in efficiency, reliability, and cost. The diagram of FIG. 1 shows selected elements of a turbocharged engine system 100 according to known art. The system comprises an internal combustion engine 102 that includes a plurality of cylinders 104, intake ports 108 extending between an intake manifold 106 and respective ones of the cylinders 104, and exhaust ports 110 extending between respective ones of the cylinders 104 and an exhaust manifold 112. An exhaust line 114 extends from the exhaust manifold 112 of the engine 102 to an intake of a first turbine 116. The output of the first turbine 116 is coupled via an exhaust line 114 to the intake of a second turbine 118, whose output is coupled to the downstream exhaust system 120, which typically includes a catalytic converter, a muffler, and a tailpipe, all of which are well known in the art, and thus not shown in detail. The illustrated system also comprises a bypass channel 121 extending between exhaust lines 114, and that includes a bypass valve 122, sometimes referred to as a wastegate. The first and second turbines 116, 118 are coupled via a driveshaft 124 to a compressor 126. The intake of the compressor 126 is coupled to a fresh air intake 128, and the output of the compressor 126 is coupled via a charge air line 134 to a cooler 130. A charge air line 134 extends between the cooler 130 and the intake manifold 106. Coolant is introduced via coolant input 132. In many systems, exhaust gas is reintroduced into the cylinders to modify the combustion characteristics of engines. In such cases, the gas will be introduced with the fresh air from downstream of turbines 116 and 118 to upstream of the compressor 126, or from upstream of turbines 116 and 118 to downstream of the compressor 126.

The operation of an internal combustion engine is well known in the art, and will therefore be described only in relevant part. As the piston in each cylinder descends during the intake stroke, charge air is drawn into the cylinders 104 via the intake ports 108, and, depending on the type and design of engine, fuel enters by one of a number of paths, such as by direct injection, port injection, carburetion, etc. The fuel and air mixture in each cylinder 104 is compressed by the respective piston in the compression stroke and caused to combust (in the case of conventional compression ignition-type engines, fuel is injected at or near the top of the compression stroke). Combustion of the fuel with oxygen from the charge air in the cylinder produces heated combustion gases creating elevated pressure within the cylinder, driving the piston, coupled to the engine crankshaft, downward, imparting rotational energy to the crankshaft.

At or near the bottom of the piston's travel, the exhaust valve opens, opening a path from the cylinder to the exhaust port and releasing residual gas pressure in the cylinder. As the crankshaft continues to rotate, the piston reciprocates in the cylinder 104, driving the remaining exhaust gases out through the respective exhaust port 110 to the exhaust manifold 112 during the exhaust stroke. The portion of the engine cycle after combustion, after the exhaust valve opens, and during which the piston is near the bottom of its stroke, is referred to herein as exhaust blowdown. The gas that exits the cylinder during this portion of the cycle does so in response to the significant pressure that remains in the cylinder once the piston has bottomed out. After exhaust blowdown, the remaining gases are expelled as the piston rises during the exhaust stroke.

In some high efficiency exhaust system designs used with naturally-aspirated engines, exhaust blowdown initiates a high-velocity stream of exhaust gases that creates a relative vacuum in the exhaust system, which assists in drawing the remaining exhaust from the cylinder. As the piston nears the top of the exhaust stroke, and the intake valve begins to open, the vacuum from the still exiting exhaust gases draws charge air and fuel into the piston via the intake valve, with the timing of the closure of the exhaust valve selected to prevent unburned fuel from escaping via the exhaust port. This process is sometimes referred to as exhaust scavenging, and permits the engine to evacuate virtually all the exhaust gases, including gases that occupy the unswept portion of the cylinder, thereby permitting a higher volume of combustibles to enter the cylinder. Exhaust scavenging generally requires specialized and individually tailored exhaust system components that enable the creation and support of the high-velocity gas stream, and is also generally limited to a narrow range of engine rpm's.

Even in naturally-aspirated engines that do not benefit from exhaust scavenging, there is only minimal resistance to gas flow in the exhaust system, so there is little resistance to the piston as it pushes the gases out. Once the exhaust gases escape past the valve, the exhaust pressure outside the piston drops to nearly ambient. However, in a turbocharged engine system such as that illustrated in FIG. 1, the turbines 116, 118, impede the exhaust flow, creating back pressure between the turbine 116 and the exhaust ports 110. This places a load on the engine, as a portion of the energy produced by the engine 102 is expended by the pistons driving the gases out against the back pressure in the exhaust system. As the still-pressurized exhaust gases enter the high-pressure turbine 116, the gases are allowed to expand, and the energy released is converted to rotational energy by the turbine, rotating the driveshaft 124. As the gas exits the high-pressure turbine 116, it may yet be only partially expanded, depending on the volume of the gases being produced by the engine 102. The gases pass from the high-pressure turbine 116 to the low-pressure turbine 118, where they are further expanded, imparting additional rotational energy to the driveshaft 124. From the low-pressure turbine 118, the exhaust gases pass into the downstream exhaust system 120 and are released to the atmosphere.

As engine speed increases, more exhaust gases are produced and the back pressure increases. While this causes the turbines to rotate faster, it also increases the load on the engine, and at some point the energy transfer efficiency of the high-pressure turbine begins to drop off. The bypass valve 122 is controlled to open as back pressure increases, venting a portion of the exhaust gas directly to the low-pressure turbine 118, which has a higher capacity than the high-pressure turbine 116, and can more efficiently extract energy from the increased volume of exhaust gas.

The energy generated by the expansion of the exhaust gas is transmitted by the driveshaft 124 to the charge air compressor 126, which draws in and compresses charge air from the charge air input 128, and transmits the compressed charge air to the cooler 130 via the air line 134. The cooler 130 transfers heat from the compressed air to a coolant, such as air passing through a radiator, or via a closed-loop cooling system to a remote radiator. The compressed air is cooled to increase its density and further increase its heat capacity, and is then moved to the intake manifold 106, and thence to the individual cylinders 104 via the intake ports 108. By introducing compressed charge air in the cylinders, the amount of oxygen in each cylinder is increased, which means that more fuel can also be added, increasing the power capacity of the engine. The higher heat capacity of the greater air mass helps control combustion temperature, which in turn assists in controlling the production of smog and pollution causing compounds. Additionally, the pressurized charge air entering the cylinders 104 imparts some energy to the piston during its intake stroke, which partially offsets the load exerted by the back pressure in the exhaust system. This is in comparison with a naturally-aspirated engine that draws charge air in by vacuum and that places a load on the engine during the intake stroke, but expends little energy driving exhaust gases out. While the energy imparted by the pressurized charge air against the piston does not fully offset the cost of driving the exhaust turbines, the additional power and efficiency gained by the higher combustion levels results in a significant net gain.

While the engine system 100 described with reference to FIG. 1 includes high- and low-pressure turbines and a bypass valve, there are many other known exhaust turbine configurations having one, two, or more turbines, with and without bypass means. For example, the following patents and patent application publication are directed to various aspects of efficient operation of a turbocharger, all of which are incorporated herein in their entirety: U.S. Pat. Nos. 4,930,315; 6,751,956; 2006/0042246.

BRIEF SUMMARY

According to an embodiment of the invention, a turbocharged engine system is provided, including an internal combustion engine, an exhaust system, and a charge air and fuel intake system. The engine system is configured to vaporize a working fluid using heat from exhaust gases exiting the engine, and the vaporized fluid is used to drive a turbine to extract energy from the working fluid. The turbine drives a compressor to pressurize charge air for the engine.

According to an embodiment, the working fluid is also used as fuel for the engine, which is injected into the engine after passing through the turbines of the turbocharger.

According to an embodiment, the fuel includes methanol, which may be dissociated to increase its working volume.

According to an embodiment, the engine is configured to separate the exhaust gases in two streams, a first stream comprising gases ejected during exhaust blowdown, and a second stream comprising gases ejected during the majority of the engine's exhaust stroke. The blowdown gases are employed to drive a separate turbine of the turbocharger.

DETAILED DESCRIPTION

In the description that follows, elements that are functionally identical to previously described elements are indicated by same reference numbers, and will not be described again in detail. Additionally, the first character of a reference number indicates the figure in which the referenced element was first introduced and described. Lines for transmitting exhaust gases, air, water, and fuel, will be referenced generally by numbers 114,134, 248, and 346, respectively, without reference to the phase of the particular fluid. The depiction of such lines is for the purpose of clarity in showing and describing the principles of the invention, and may be embodied as hoses, tubes, passages, channels, etc. Furthermore, in operation, various alternative means for transmitting the respective fluids may also be employed. For example, the output of one component may be coupled directly to the input of another, obviating the need for a transmission line at that location. Alternatively, two or more of the components may be housed in a common casing, or integrated into a single element. In other cases, elements that are described here as single units may be separated into two or more components with the appropriate couplings, and that together fulfill the same function.

Figure 2:
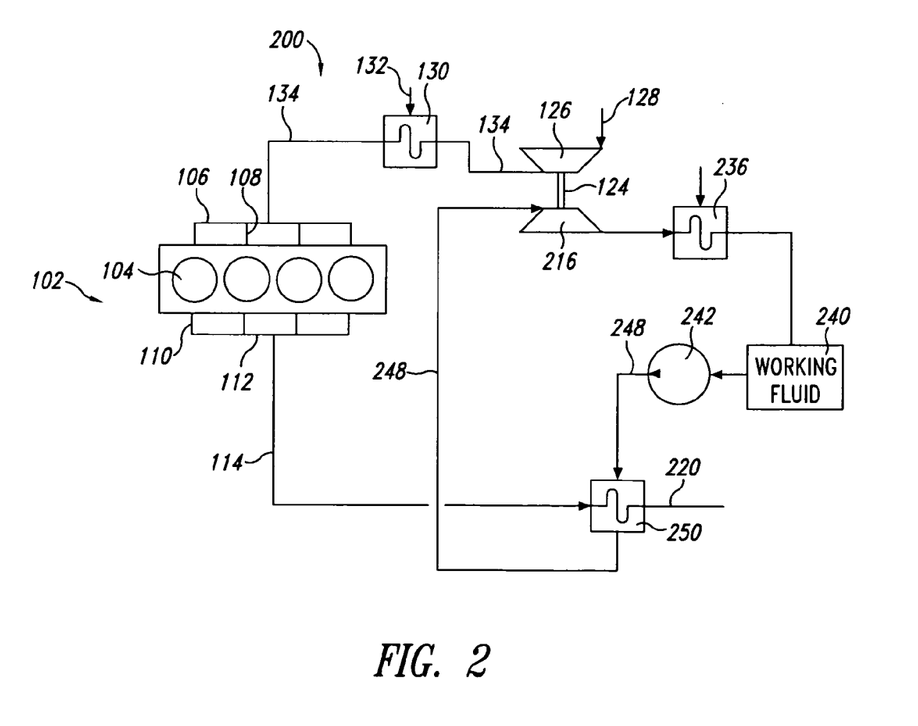
FIGS. 2-3 and 5-9 are diagrams showing engine systems according to respective embodiments of the invention.

Referring now to FIG. 2, a turbocharged engine system 200 is shown, according to a first embodiment of the invention. The system 200 includes an engine 102 having a plurality of cylinders 104 and a heat exchanger 250 having an exhaust input coupled to the output of the exhaust manifold 112, and an exhaust output coupled to a downstream exhaust system 220 that includes a catalytic converter, a muffler, and a tailpipe, such as are well known in the art.

A working fluid source 240 is coupled, via fluid lines 248, to a pump 242, and an output of the pump 242 is coupled to a fluid input of the heat exchanger 250, a fluid output of which is coupled to an input of a turbine 216. An output of the turbine is coupled to a fluid input of a cooler 236 such as, for example, a radiator, and an output of the cooler 236 is coupled to a return of the working fluid source 240. The turbine 216 is coupled via the driveshaft 124 to the charge air compressor 126.

In operation, hot gases produced by the engine 102 are transmitted from the exhaust manifold 112 to the heat exchanger 250, and from there to the downstream exhaust system 220. The pump 242 draws working fluid, such as, for example, water, from the working fluid supply 240 and transmits a stream of fluid under pressure to the heat exchanger 250. Heat from the heat exchanger 250 is transferred to the fluid, which is vaporized. The vapor is further heated in the heat exchanger 250, superheating the vapor. The vapor is then transmitted to the turbine 216 where the vapor is expanded, the resulting energy being transmitted by the turbine 216 to the charge air compressor 126, where it is employed to compress the incoming charge air. The vapor is then condensed in the cooler 236 and returned to the fluid source 240.

The embodiment of FIG. 2 provides a number of advantages over known internal combustion engine systems. In most prior art systems, the heat from the exhaust is largely dissipated to the atmosphere, which represents a loss of energy. The system 200 of FIG. 2, in contrast, reclaims much of that heat energy, which is used to pressurize the charge air. When the pressurized charge air enters the cylinders, it applies downward force on the pistons, which is transmitted to the crankshaft. In effect, the exhaust/fluid/air cycle acts as a heat engine, imparting additional energy to the overall output of the system. Also, because the exhaust gases do not directly drive the turbine 216, but instead flow directly through the heat exchanger, there is little back pressure introduced, eliminating that load on the engine and further increasing efficiency as compared to prior art systems.

The embodiment of FIG. 2 is shown as having a single turbine 216 through which the superheated steam passes to drive the charge air compressor. According to an alternative embodiment, a first, high-pressure turbine and a second, low-pressure turbine are employed. Bypass means may also be included to selectively shunt a portion of the steam generated past the first turbine.

According to an embodiment, the working fluid is also employed as the engine coolant and the charge air coolant. The working fluid is preheated by the engine and cooler 130 before it is introduced into the heat exchanger 250. By using a common fluid throughout the engine system, the system is simplified, there are fewer fluid reservoirs, radiators, etc., and heat energy from the engine and charge air can contribute to driving the turbine.

According to another embodiment, the working fluid is gaseous at normal ambient temperature and pressure, and thus does not condense anywhere in the cycle. Many fluid condensates are highly corrosive, which can cause damage in a heating/cooling cycle such as that disclosed, especially if condensation occurs in an unintended location, such as behind turbine blades, etc. By using a normally gaseous working fluid, such problems can be reduced or eliminated.

Figure 3:
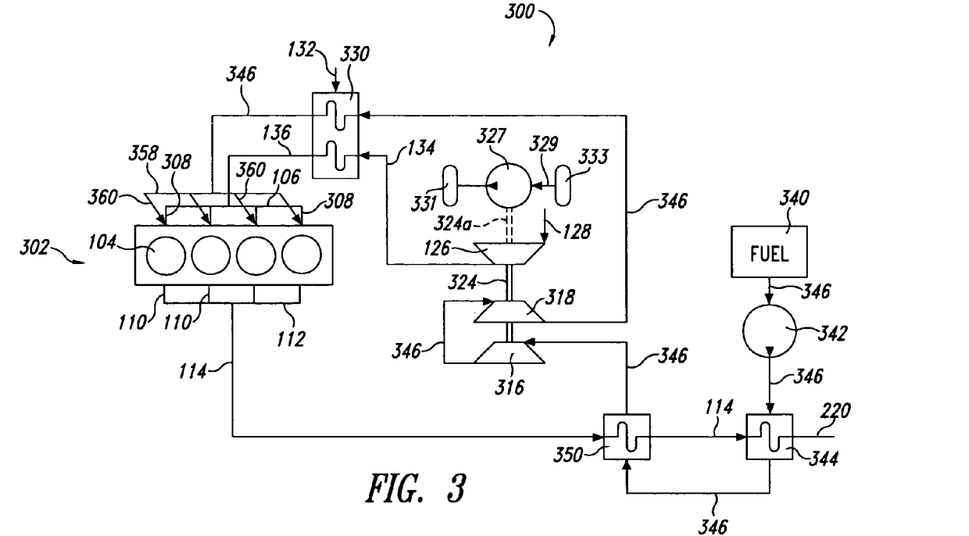

Turning now to FIG. 3, a turbocharged engine system 300 is shown, according to a second embodiment of the invention. The system 300 includes an engine 302 and an exhaust manifold 112, a first heat exchanger 350, and a second heat exchanger 344.

A fuel source 340 is coupled, via fuel lines 346, to a pump 342, and an output of the pump 342 is coupled to a fuel input of the second heat exchanger 344. A fuel output of the second heat exchanger is coupled to a fuel input of the first heat exchanger 350, a fuel output of which is coupled to an input of a first turbine 316. An output of the first turbine 316 is coupled to an input of a second turbine 318, an output of the second turbine 318 is coupled to a fuel input of a cooler 330, and a fuel output of the cooler 330 is coupled to a fuel intake manifold 358. Port injectors 360 are coupled to the fuel intake manifold 358 and configured to inject fuel into the intake ports 308 of the engine 302 during intake strokes of the pistons of the respective cylinders 104.

An output of the charge air compressor 126 is coupled to an air input of the cooler 330, and the air output of the cooler is coupled to an engine intake manifold 106. The cooler 330 is shown as a single unit configured to cool both the charge air and the fuel. In other embodiments, these functions may be performed separately in separate units. Additionally, the cooling medium employed to cool the charge air and the fuel can be any appropriate medium, such as air, via a radiator, or water or other fluid coolant via a cooling loop.

A hydraulic pump 327 is shown coupled to the first and second turbines by an extension 324a of the driveshaft 324, shown in dotted lines. Fluid supply lines 329 place high- and low-pressure fluid sources 331, 333 in fluid communication with, respectively, high- and low-pressure fluid ports of the hydraulic pump 327.

In operation, hot gases produced by the engine 302 are transmitted from the exhaust manifold 112 to the first heat exchanger 350, and from there to the second heat exchanger 344 and the downstream exhaust system 220. The pump 342 draws fuel from the fuel source 340 and transmits a pressurized fuel stream to the second heat exchanger 344. Heat from the second heat exchanger 344 is transferred to the fuel, vaporizing the fuel. The fuel vapor is transmitted to the first heat exchanger 350, where heat from the exhaust is transferred to the fuel vapor, superheating the vaporized fuel. The superheated fuel vapor is then transmitted to the first and second turbines 316, 318, where the fuel is partially expanded, the resulting energy being transmitted by the driveshaft 124 to the charge air compressor 126, where it is employed to compress the incoming charge air.

The expansion of the fuel vapor in the turbines 316, 318 also reduces its temperature (according to Boyle's law), and the vapor is further cooled by the cooler 330, although the fuel is preferably not permitted to condense, and retains at least sufficient pressure to enable injection at the port injectors 360. The pressurized fuel and charge air enters the cylinders 104, imparting energy to the pistons as they move downward in their respective intake strokes.

The embodiment of FIG. 3 provides further advantages, beyond those described with reference to the embodiment of FIG. 2. For example, the fuel can be prevaporized before it is introduced into the cylinders, which reduces the energy cost of initiating combustion, thereby increasing the net energy output. Additionally, fuel that enters the cylinders as a vapor, rather than as atomized droplets, typically burns more completely, releasing more energy and producing cleaner exhaust gases.

According to some embodiments, the fuel employed is methanol ($CH_3OH$) or methanol and water. The pump 342 pressurizes the fuel to a selected pressure, ranging, according to various embodiments, from a pressure of around 15 bar up to around 200 bar or more. The second heat exchanger 344 is configured as a catalytic converter. The fuel is vaporized and dissociated by the second heat exchanger 344 and superheated by the first heat exchanger 350. As is well known in the art, dissociation of methanol produces hydrogen and carbon monoxide ($CH_3OH \rightarrow 2H_2 + CO$).

When dissociated, one mole of vaporized methane produces a total of three moles: two of hydrogen, and one of carbon monoxide, effectively tripling the volumetric flow rate as compared to methanol. The work extracted by an expander, such as the turbines of the present disclosure, is directly proportionale to the volumetric flow rate, times the pressure change. Thus, by dissociating the methanol, more work can be extracted from the fluid. Additionally, when combusted, the dissociated methanol has about 20% more chemical energy than the reactant methanol, thereby further increasing engine efficiency. The combustion of dissociated methanol produces the same byproducts as combustion of methanol ($2H_2 + CO + 1\frac{1}{2}O_2 \rightarrow CO_2 + 2H_2O$). If, following dissociation, the dissociated methanol is reformed with steam, the reformed product provides one additional mole of working fluid ($2H_2 + CO + H_2O \rightarrow 3H_2 + CO_2$), but has less energy than dissociated methanol.

The high level of work that is available for extraction in accordance with the system and method described above may exceed the boost level required by the engine to operate at best efficiency. Accordingly, other power extraction means can be provided to extract the surplus energy for use elsewhere. For example, the hydraulic pump 327 shown in FIG. 3 can be selectively engaged to the first and second turbines 316, 318 when the work extracted by the turbines exceeds that required to drive the compressor 126. The surplus work is used to draw low-pressure fluid from the low-pressure fluid supply 331 and pump the fluid at high-pressure to the high-pressure fluid supply. The pressurized fluid can be used to supply power to other sub-systems that would otherwise draw energy from the engine for the purpose, such as, for example, power steering and brake boosters, air conditioning compressor, etc. Additionally or alternatively, the pressurized fluid can be used to drive a hydraulic motor coupled to the driveshaft of the engine to supplement the engine output. Finally, the pump 327 can be driven as a motor by previously stored high-pressure fluid to drive the compressor 126 when operating conditions are such that the demand exceeds the energy available. It can be seen that each of these applications either directly or indirectly improves engine output efficiency.

The pump 327 ganged on a common driveshaft with the compressor 126 is shown merely as one example of a means for extracting surplus work from the vaporized and dissociated methanol. Other appropriate means can be employed, either ganged as shown, or in separate systems, including additional turbines, pumps, electrical generators, etc.

Dissociation and reformation of methanol is discussed in detail in the following patents, all of which are incorporated herein by reference in their entireties: U.S. Pat. Nos. 4,632,774; 4,316,880; and 4,780,300.

In addition to the pump 342 that pressurizes the fuel prior to vaporization, an additional low-pressure fuel pump may be provided between the fuel source 340 and the pump 342 to provide a constant stream of fuel to the pump 342.

Figure 4A:
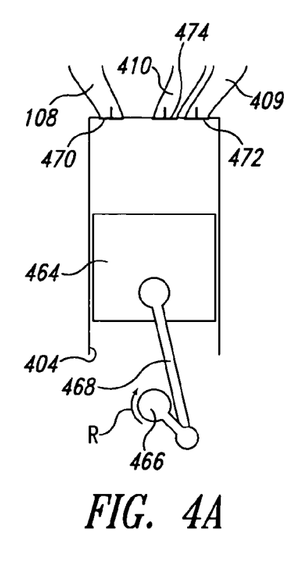
FIGS. 4A-4C show a cylinder of an engine at respective points of a single revolution of the crankshaft, according to the system of the embodiment of FIG. 5.
Figure 4B:
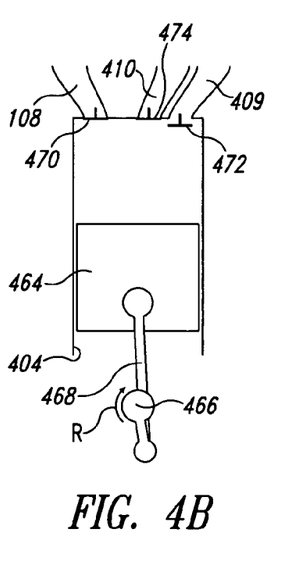
Figure 4C:
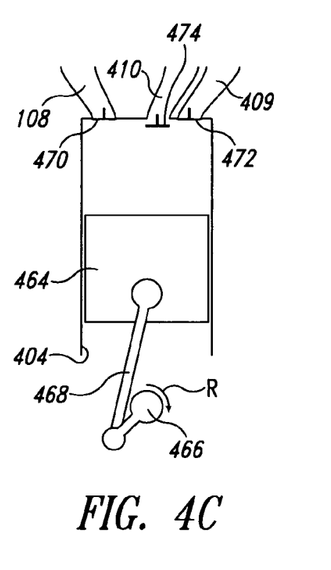
Figure 5:
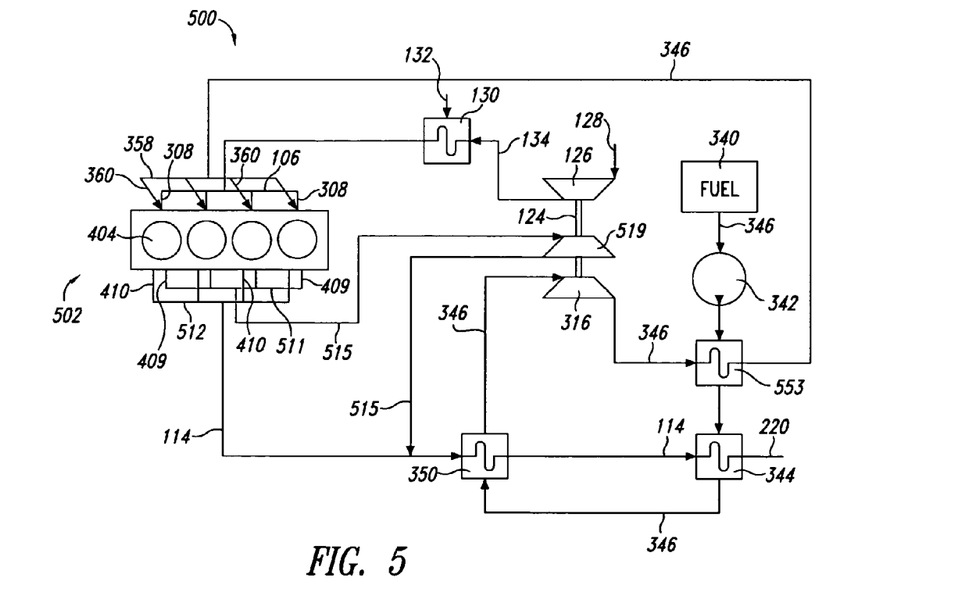

Referring initially to FIG. 5, a turbocharged engine system 500 is shown, according to an embodiment of the invention. The engine system 500 includes an engine 502, elements and operation of which are described with reference to FIGS. 4A-4C.

Turning now to FIGS. 4A-4C one of a plurality of cylinders 404 of the engine 502 is shown. The cylinder 404 comprises a piston 464 coupled to the crankshaft 466 by a connecting rod 468, an intake valve 470 that regulates communication between the intake port 108 and the cylinder 404, and first and second exhaust valves 472, 474 that regulate communication between the cylinder 404 and respective exhaust ports 409, 410. FIGS. 4A-4C show the cylinder 404 at respective points of a single revolution of the crankshaft 466 during the combustion/expansion and exhaust strokes of the piston 464. Not shown are the intake and compression strokes, which occur according to known principles. FIG. 4A shows the position of the piston 464 with the crankshaft at about 45° before bottom-dead-center (BDC), during the combustion/expansion stroke of the piston 464, with all valves closed. Combustion within the cylinder 404 vastly expands the contents of the cylinder, applying downward force to the piston 464, which force is transferred by the connecting rod 468 to the crankshaft 466, driving it to rotate in a clockwise direction R.

FIG. 4B shows the crankshaft at about 10° before BDC, with the piston 464 near the end of the combustion/expansion stroke and near the bottom of its sweep. The first exhaust valve 472 is in an open position, placing the cylinder 404 in fluid communication with the first exhaust port 409. FIG. 4C shows the crankshaft at about 45° after BDC, during the exhaust stroke of the piston 464, with the first exhaust valve 472 closed and the second exhaust valve 474 open, placing the cylinder 404 in fluid communication with the second exhaust port 410.

In normal operation of the engine 502, the products of combustion in the cylinder 404 are only partially expanded as the piston 464 descends during the combustion/expansion stroke, and considerable pressure remains in the cylinder 404 when the first exhaust valve 472 opens, typically between 25° and 10° before BDC of the crankshaft 466. Accordingly, a large portion of the exhaust gases in the cylinder 404 escape the cylinder via the first exhaust port 409 while the piston 464 is near the bottom of its travel, during exhaust blowdown (as defined herein). The first exhaust valve 472 closes and the second exhaust valve 474 opens, typically between about 10° and 25° after BDC, and the piston drives the remaining exhaust gases from the cylinder 404 via the second exhaust port 410 during the remainder of the exhaust stroke of the piston 464, said remainder constituting the majority of the exhaust stroke in terms of either sweep or crank angle.

While the crankshaft 466 is within a few degrees of BDC, movement of the piston 464 in the cylinder is minimal. For example, between 20° before BDC and BDC, which represents about 11% of the 180° of rotation of the crankshaft 466 between top- and bottom-dead-center, the piston only travels about 4½% of its total sweep, and between 10° before BDC and BDC, which represents a little over 5% of the 180° of crankshaft rotation, the piston only travels about three-quarters of 1% of its total sweep. Accordingly, not only does the exhaust exiting the first exhaust valve 409 do so under significant pressure, but the engine is substantially insensitive to the change in pressure in the cylinder as the gases exit, and also to any back pressure in the first exhaust port 409.

Timing of the first and second exhaust valves is selected according to the particular engine design, to transmit as much volume and pressure of exhaust gases via the first exhaust port 409 as possible without adversely affecting the operation of the engine due to undesirable back pressure during the exhaust stroke nor beginning the exhaust process via port 409 too early in the expansion stroke. In some embodiments, the timing is modified as engine speed increases, inasmuch as the volume of gases produced per cycle will not change substantially, while the time between any two points in the rotation will diminish with an increase in engine speed, resulting in less time for an equal volume of gas to escape. Thus, for example, at low rpm's, the first exhaust valve may be configured to open at between 10° and 5° before BDC, or even as late as BDC, and to close somewhere between BDC and 10° after BDC. As engine speed increases, the arc over which the first exhaust valve remains open may increase to 25° before and/or after BDC, or more. The closing of the first exhaust valve 472 and the opening of the second exhaust valve 474 are synchronized to occur with some overlap, so that there is, as far as possible, no point at which both valves are closed, but also so that there is no point at which high pressure exhaust gas is permitted to vent back from the first exhaust port 409 to the second exhaust port 410 via the respective valves 472, 474 and the cylinder 404. The first exhaust valve 472 is controlled to close before a first exhaust valve of another cylinder opens, so, that the cylinder 404 is not partially repressurized by the blowdown gases of the next cylinder, which would reduce the efficiency of the system.

Turning again to FIG. 5, it can be seen that the first exhaust ports 409 are coupled to a first exhaust manifold 511, while the second exhaust ports 410 are coupled to a second exhaust manifold 512. The first heat exchanger 350 and the second heat exchanger 344 are coupled in series to receive exhaust gases from the second exhaust manifold 512 substantially as described with reference to the corresponding elements of the embodiment of FIG. 3. The first exhaust manifold 511 is coupled to an input of a blowdown turbine 519 via a blowdown exhaust line 515, and an output of the blowdown turbine is coupled to an exhaust line 114 upstream of where the exhaust gases enter the first heat exchanger 350.

The fuel supply 340 is coupled to the fuel pump 342 and thence to a first fuel input of a preheater 553, a first output of which transmits the fuel to the heat exchangers 344, 350 and the first turbine 316 substantially as described with reference to the corresponding elements of the embodiment of FIG. 3.

However, in the embodiment of FIG. 5, the output of the first turbine is coupled to a second fuel input of the preheater 553, a second fuel output of which is coupled to the fuel intake manifold 358.

In operation, highly pressurized exhaust blowdown gases are transmitted from the first exhaust manifold 511 to the blowdown turbine 519, where the expanding gases impart energy to the driveshaft 124. The expanded blowdown gases are then merged with the gases from the second exhaust manifold 512 to pass through the heat exchangers 350, 344, as previously described.

Fuel from the fuel supply 340 is pumped through the preheater 553 where the fuel is preheated prior to entering the second heat exchanger 344, while cooling the vaporized and partially expanded fuel exiting the turbine 316 prior to introduction to the fuel intake manifold 358.

By drawing off the blowdown gases separately from the remaining exhaust gases, the residual pressure in the cylinders 404 after the combustion/expansion stroke of the pistons 464 can be used to drive the blowdown turbine 519, without placing any additional load on the engine 502. While this results in back pressure in the first exhaust manifold 511, the back pressure is felt against the pistons only while they are at or near BDC, which means that virtually none of the back pressure is transmitted as braking force to the crankshaft 466. Meanwhile, the second exhaust manifold 512 and the downstream exhaust lines 114, etc., do not experience any significant back pressure. While a single blowdown turbine 519 is shown, the blowdown gases can be routed through two or more such turbines, as necessary, to extract the available energy therefrom. It should also be understood that the blowdown turbine concept may be configured as either a single turbocharger unit or with other boost system configurations.

As described with reference to FIGS. 4A-4C, the cylinder 404 employs first and second exhaust valves to separate the blowdown gases from the remaining exhaust gases. According to an alternate embodiment, the cylinder comprises a single exhaust port that bifurcates, with a valve positioned within the exhaust port and configured to selectively direct exhaust gases to one of two exhaust manifolds. The valve is controlled to direct the blowdown gases to one of the two manifolds, and to switch the exhaust flow to the other manifold at between 0° and 25° after BDC.

Figure 6:
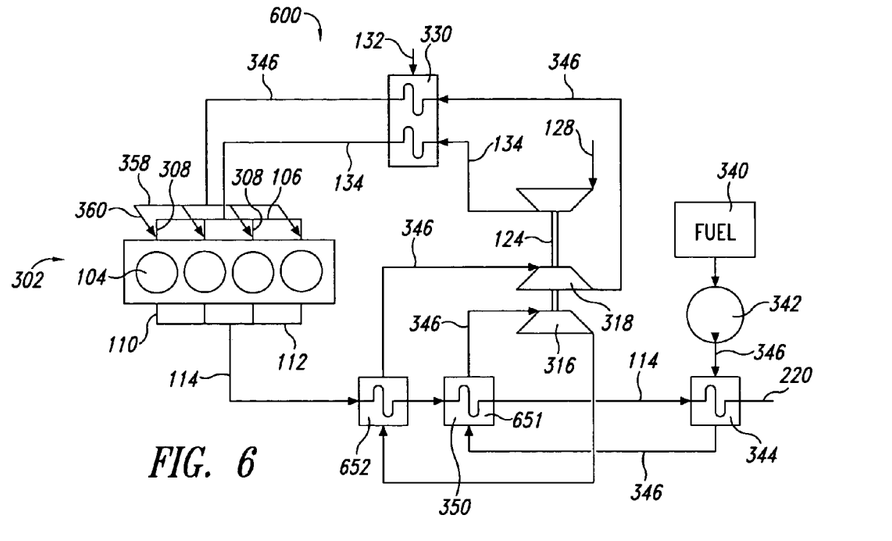

Referring now to FIG. 6, a turbocharged engine system 600 is shown, according to another embodiment of the invention. The system 600 comprises virtually all the elements described with reference to the embodiment of FIG. 3, and also includes a third heat exchanger 652, arranged upstream from the first heat exchanger 350. Additionally, instead of a fluid coupling between the output of the first turbine 316 and the second turbine 318, the output of the first turbine is coupled to an input of the third heat exchanger 652, an output of which is coupled to the input of the second turbine 318. Thus, after the fuel vapor exits the first turbine 316, it passes through the third heat exchanger 652, is reheated, and then passes through the second turbine 318. In this way, in embodiments where the volume of fuel vapor is not sufficient to transmit the energy necessary to adequately pressurize the charge air, it is sent through a second heat-and-expand cycle to make up the difference, before it is sent to the engine 302 for combustion.

The embodiment illustrated in FIG. 7 includes all the components described with reference to the embodiment of FIG. 6, but provides an alternate path for the fuel and fuel vapor. In the turbocharged engine system 700 of FIG. 7, the output of the pump 342 is coupled to the fuel input of the first heat exchanger 350, the output of the first heat exchanger is coupled to the first turbine 316, and the output of the first turbine is coupled to the fuel input of the second heat exchanger 344 (which may also comprise a catalytic converter), whose output is coupled to the fuel input of the third heat exchanger 652. The output of the third heat exchanger is coupled to the input of the second turbine 318, whose output is coupled to the cooler 330.

Figure 7:
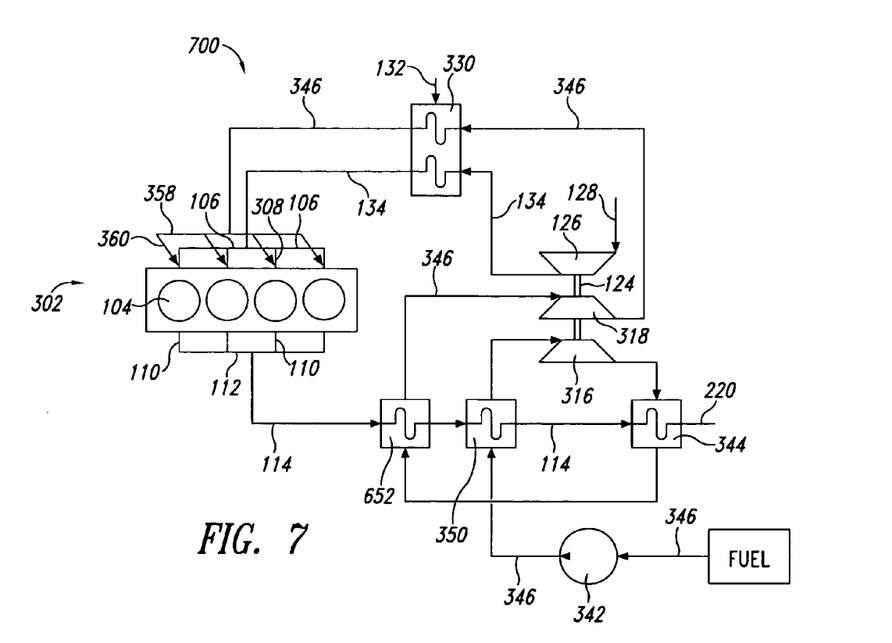

According to a version of the embodiment of FIG. 7 modeled under the direction of the inventor, the pump 342 pressurizes methanol fuel to 90 bar at ambient temperature. The fuel is vaporized in the first heat exchanger 350, exiting at a pressure of slightly less than 90 bar, at 440° C. The fuel vapor exits the first turbine at 18 bar, at 350° C., and is then dissociated in the second heat exchanger 344 (which includes a catalytic converter), exiting the converter as hydrogen and carbon monoxide at slightly less than 18 bar, and 350° C. Passing through the third heat exchanger 652, the dissociated fuel exits at a little less than 18 bar, 700° C., before being introduced into the second turbine 318.

It will be recognized that, generally speaking, the heat exchanger closest to the exhaust manifold will be the hottest in the series, as the exhaust gases cool as they pass through the system. However, it is also known that, depending on the compounds present in the exhaust gases, an exhaust gas catalytic converter, of the kind used in the exhaust systems of most modern automobiles, can operate exothermically, generating additional heat as a byproduct of the conversion of those compounds. Thus, depending on the type and design of the engine, the arrangement of the fuel flow is selected to make best use of the distribution of heat, and can be configured to draw heat from the exhaust gas catalytic converter if that can be done without affecting its operation.

Figure 8:
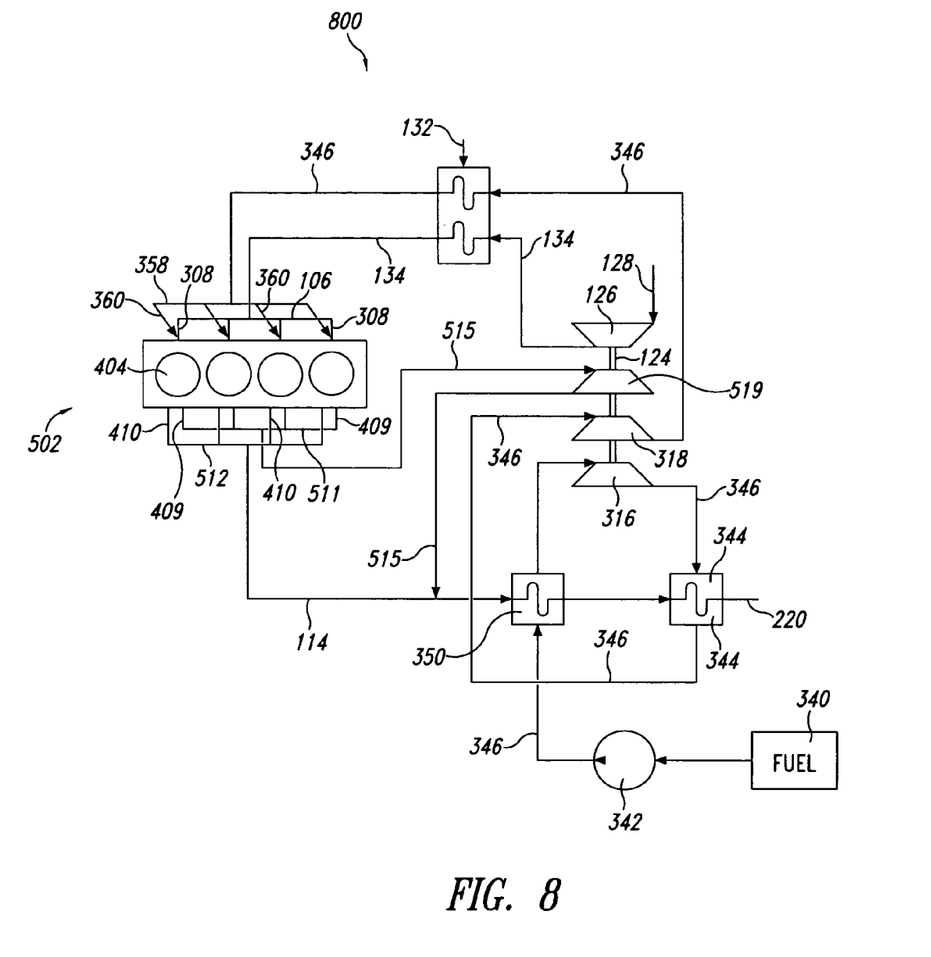

FIG. 8 shows a turbocharged engine system 800 that includes an engine 502 and a blowdown turbine 519 configured to operate substantially as described with reference to FIGS. 4A-5. The system 800 also includes a first heat exchanger 350, a second heat exchanger 344, a first turbine 316 and a second turbine 318, and other components similar to those described with reference to FIG. 3. However, in the system 800, the fuel is pumped initially to the first heat exchanger 350, where it is heated and transmitted to the first turbine 316. From there, the fuel is transmitted to the second heat exchanger 344 and from there to the second turbine 318.

In a version of the embodiment of FIG. 8 modeled under the direction of the inventor, the fuel is pumped at up to 200 bar and ambient temperature, to the first heat exchanger, where it is superheated to 700° C. After passing through the first turbine 316, the fuel is transmitted to the second heat exchanger 344 where it is dissociated and transmitted to the second turbine 318.

According to models of various embodiments testing the viability of the principles disclosed, engine efficiency can be improved by as much as 40% over prior art systems of comparable power and performance.

Figure 9:
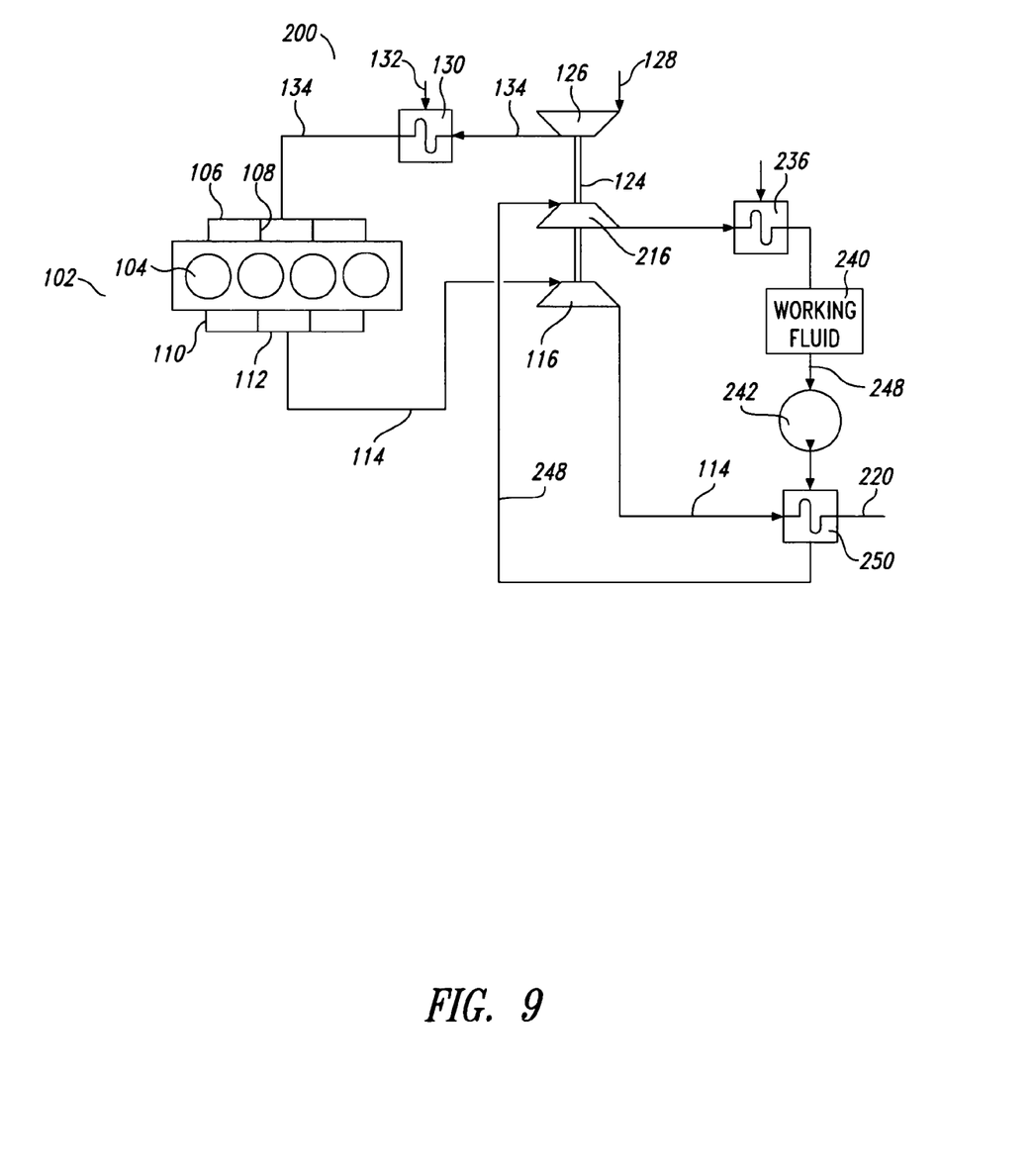

FIG. 9 shows an embodiment in which exhaust gases from the exhaust manifold are transmitted to a conventional turbine 116 powered by exhaust pressure, and from there, the exhaust gases are transmitted to a heat exchanger 250 to power a heat-driven system substantially as described with reference to FIG. 2. A conventional turbine can also be combined with heat-driven turbines configured according to other embodiments.

Many of the disclosed embodiments include elements that are not shown or described in detail with respect to other embodiments, such as, for example, blowdown exhaust systems, fuel preheaters, supplemental energy extraction systems, etc. This is only to avoid unnecessary complexity and simplify the disclosure. Elements of the various embodiments described above can be combined, and further modifications can be made, to provide a large number of embodiments without deviating from the spirit and scope of the invention. For example, the number and arrangement of turbines, driveshafts, and compressors can be varied and bypass channels can be employed where such modifications are deemed to improve efficiency or economy.

In the disclosed embodiments, methanol has been described as a fuel, but other fuels can also be employed. In some cases, the fuel may be dissociated as described here, while with other fuels, dissociation will be impractical. Where fuel is dissociated, any of a number of different catalyzing agents may be required, depending on the particular process used. In such embodiments, one or more of the heat exchangers can be appropriately configured, according to known principles, to produce the catalysis.

According to an embodiment of the invention, water is introduced to be vaporized with the fuel, to provide an increased volume of vapor to drive the turbines. Introduction of water vapor into the cylinders with the fuel and air is generally not detrimental, and in some cases may be beneficial.

According to an embodiment of the invention, the fuel is maintained at a pressure above its critical pressure, thereby preventing the formation of vapor as it is heated. Above its critical pressure, the fuel becomes compressible, and can be expanded in a turbine to drive a charge air compressor.

As described with reference to FIG. 3, excess energy available in the vaporized or dissociated fuel, beyond that required to drive the charge air compressor, can be employed to drive a hydraulic pump or an electric generator coupled to the turbines to convert the energy to a form that can be stored or used in other systems of the associated vehicle. In embodiments that employ naturally-aspirated engines, in which a charge air compressor is not employed, all of the energy released to the turbines can be used to drive a hydraulic pump, electric generator, or other device.

Pressures and temperatures from modeling tests are provided with some of the disclosed embodiments, but these are merely exemplary, inasmuch as such parameters are determined at least in part by aspects such as system design, fuel selection, and operating conditions.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

Ordinal numbers, e.g., first, second, third, etc., are used in the claims merely for the purpose of clearly distinguishing between claimed elements or features thereof. The use of such numbers does not suggest any other relationship, e.g., order of operation or relative position of such elements, nor does it exclude the possible combination of the listed elements into a single, multiple-function, structure or housing. Furthermore, ordinal numbers used in the claims have no specific correspondence to those used in the specification to refer to elements of disclosed embodiments on which those claims read.

The term coupled, as used in the claims, includes within its scope indirect coupling, such as when two elements are coupled with one or more intervening elements even where no intervening elements are recited. For example, where a claim recites a fluid output of a first heat exchanger coupled to a fluid input of a second heat exchanger, this language also reads on embodiments in which fluid passes from a first heat exchanger through a turbine before entering a second heat exchanger.

Where the claims recite language indicating that exhaust gases are transmitted without introducing back pressure, this is to be understood as meaning that the exhaust gases are transmitted without passing through a turbine/expander or other device that operates by converting a pressure drop into work, or that otherwise substantially impedes or blocks the passage of exhaust gases.

The term exit, is used in the claims with reference to fluids, to indicate ordinal relationships between specific elements with which it is used. For example, if a claim recites "introducing exhaust gases exiting the engine into a heat exchanger," this indicates that the flow of gases is from the engine toward the heat exchanger, but is not to be construed as indicating that there are no other elements through which the gases pass after exiting the engine and before entering the heat exchanger.

All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

The invention claimed is:

1. A method of providing boost for an internal combustion engine, comprising:
   combusting a mixture of fuel and oxygen in a cylinder of the engine, thereby driving a piston in the cylinder and imparting rotational energy to a crankshaft of the engine, and producing heated exhaust gases;
   transmitting the exhaust gases from an exhaust manifold of the engine to an inlet of a first heat exchanger and to an inlet of a first turbine;
   vaporizing and expanding a working fluid, wherein the working fluid is methanol, including vaporizing the working fluid in the first heat exchanger using heat from the exhaust gases, and expanding the vaporized working fluid by introducing the working fluid into the first turbine;
   compressing charge air with a compressor using energy released by the expansion of the working fluid, the compressor coupled to the first turbine via a drive shaft, and the compressor having an output in fluid communication with an intake port of the engine; and
   introducing the compressed charge air into the cylinder of the engine via the intake port of the engine.

2. The method of claim 1, comprising introducing the expanded vaporized working fluid into the cylinder of the engine.

3. The method of claim 1, comprising dissociating the working fluid using heat from the exhaust gases exiting the engine.

4. The method of claim 1 wherein the vaporizing and expanding step comprises:

introducing the exhaust gases exiting the engine into a high-energy path of the first heat exchanger;

introducing the working fluid into a low-energy path of the first heat exchanger;

introducing the exhaust gases exiting the first heat exchanger into a high-energy path of a second heat exchanger; and introducing the working fluid into a low-energy path of the second heat exchanger.

5. The method of claim 4, comprising catalyzing harmful compounds of the exhaust gases in the second heat exchanger to form less harmful compounds.

6. The method of claim 4 wherein the vaporizing and expanding step comprises introducing the working fluid exiting the second heat exchanger into the low-energy path of the first heat exchanger.

7. The method of claim 4 wherein the vaporizing and expanding step comprises introducing the working fluid exiting the second heat exchanger into a first turbine.

8. The method of claim 7 wherein the vaporizing and expanding step comprises introducing the working fluid exiting the first turbine into a second turbine.

9. The method of claim 8 wherein the vaporizing and expanding step comprises introducing the working fluid exiting the first turbine into the low-energy path of the first heat exchanger, and introducing the working fluid exiting the first heat exchanger into the second turbine.

10. The method of claim 7, comprising introducing the working fluid exiting the first turbine into the cylinder of the engine.

11. The method of claim 1 wherein the exhaust manifold is a first exhaust manifold, the method comprising:

separating the exhaust gases into a second exhaust manifold, including gases released from the cylinder during exhaust blowdown, and the first exhaust manifold, including gases released from the cylinder during an exhaust stroke of the piston; and introducing the exhaust gases from the second exhaust manifold into a first turbine.

12. The method of claim 11 wherein the vaporizing and expanding step comprises introducing the exhaust gases exiting the first turbine into the inlet of the first heat exchanger.

13. The method of claim 11 wherein the separating step comprises closing a first exhaust valve while the piston is within 25 degrees after bottom-dead-center of an exhaust stroke of the piston.

14. The method of claim 13 wherein the separating step comprises opening a second exhaust valve in the cylinder, including synchronizing the opening of the second exhaust valve to coincide with the closing of the first exhaust valve.

15. A turbocharged engine system, comprising:

an engine configured to operate by internal combustion and having a plurality of cylinders and an exhaust manifold;

a plurality of port injectors configured to inject fuel into respective intake ports of the engine;

an exhaust system extending from an output of the exhaust manifold to a tailpipe, configured to transmit exhaust gases from the exhaust manifold to the tailpipe, the exhaust system including:

a first heat exchanger having an exhaust input coupled to the exhaust manifold of the engine and configured to transfer heat from exhaust gases of the engine to a working fluid, wherein the working fluid is methanol; and a first turbine having an input in fluid communication with a fluid output of the first heat exchanger and an output coupled to inputs of the port injectors, the first turbine being configured to expand the working fluid and convert energy released thereby to rotational energy; and a compressor coupled to the first turbine via a drive shaft, the compressor having an output in fluid communication with the intake orts of the en sine the compressor or configured to use the rotational energy transmitted by the first turbine to increase the pressure of charge air to be taken into the engine.

16. The engine system of claim 15 comprising:

a pump having an input coupled to a source of working fluid and an output coupled to a fluid input of the first heat exchanger.

17. The engine system of claim 15 wherein the first heat exchanger is a catalytic converter configured to convert harmful compounds present in the exhaust gases of the engine to less harmful compounds.

18. The engine system of claim 15 wherein the exhaust system comprises a second heat exchanger having an exhaust input coupled to an exhaust output of the first heat exchanger and configured to transfer heat from the exhaust gases of the engine to the working fluid.

19. The engine system of claim 15 wherein an output of the first turbine is coupled to an input of a reservoir of working fluid.

20. The engine system of claim 15, comprising a fuel intake manifold of the engine coupled between the first turbine and the plurality of port injectors, with the output of the first turbine coupled to the input of the fuel intake manifold, and an input of each of the plurality of port injectors is coupled to a respective output of the fuel intake manifold.

21. The engine system of claim 15 wherein the exhaust system comprises a second heat exchanger having a high-energy path coupled between the first turbine and the plurality of port injectors, with a first end of the high-energy path coupled to the output of the first turbine and a second end of the high-energy path coupled to the inputs of the port injectors, and having a first end of a low-energy path coupled to an output of a fuel source and a second end of the low-energy path coupled to a fluid input of the first heat exchanger.

22. The engine system of claim 15 wherein the first heat exchanger is configured to dissociate the methanol.

23. The engine system of claim 15 wherein the exhaust system comprises a second turbine having an input coupled to an output of the first turbine and configured to expand the working fluid and convert energy released thereby to rotational energy.

24. The engine system of claim 15 wherein the engine is configured to separate the exhaust thereof into a first exhaust stream comprising exhaust gases ejected from the cylinders during their respective exhaust strokes and a second stream of exhaust comprising exhaust gases ejected from the cylinders during exhaust blowdown of the respective cylinders.

25. The engine system of claim 24, comprising:

a second exhaust manifold coupled to the engine to receive the second stream of exhaust gases, the first manifold being coupled to the engine to receive the first stream of exhaust gases; and a blowdown turbine having an input coupled to the second exhaust manifold and configured to expand the second stream of exhaust gases and convert energy released thereby to rotational energy.

26. A turbocharged engine system, comprising:

a four-stroke engine having a cylinder, a piston positioned within the cylinder, and a crankshaft coupled to the piston via a connecting rod, the engine configured to separate blowdown exhaust gases from gases that exit the cylinder during a majority of an exhaust stroke of the piston;

a first exhaust manifold coupled to the engine and configured to receive the blowdown gases;

a first turbine having an input coupled to the first exhaust manifold and configured to convert energy released during expansion of the blowdown gases to rotational energy;

a second exhaust manifold coupled to the engine and configured to receive the gases that exit the cylinder during the majority of the exhaust stroke of the piston;

an exhaust system coupled to an output of the second exhaust manifold and configured to transmit exhaust gases from the second manifold to an output of the turbocharger system, the exhaust system including a first heat exchanger coupled to receive exhaust gases from the second exhaust manifold and configured to transfer heat from gases entering the first heat exchanger to a working fluid, wherein the working fluid is methanol;

a second turbine having an input coupled to the first heat exchanger and configured to expand the working fluid heated by the first heat exchanger, the second turbine coupled to the first turbine via a drive shaft; and a charge air compressor coupled to the drive shaft, the compressor having an output in fluid communication with an intake port of the engine, and the compressor configured to compress charge air for the engine and deliver charge air to the engine via the intake port.

27. The engine system of claim 26, comprising:
a first exhaust valve configured to regulate fluid communication between the cylinder of the engine and the first exhaust manifold; and
a second exhaust valve configured to regulate fluid communication between the cylinder of the engine and the second exhaust manifold.

28. The engine system of claim 26, comprising an exhaust valve positioned within an exhaust port of the engine and configured to selectively direct exhaust gases to either the first or second exhaust manifolds.

29. The engine system of claim 28, wherein the exhaust valve is controlled to switch the exhaust flow from the first exhaust manifold to the second exhaust manifold at between 0° and 25° after bottom-dead-center.

30. The engine system of claim 26 wherein an output of the first turbine is coupled to the exhaust system such that gases exiting the first turbine merge with gases in the exhaust system before entering the first heat exchanger.

31. The engine system of claim 26 wherein an output of the second turbine is coupled to an input of a fuel intake manifold of the engine.

* * * * *